United States Patent [19]

Albrecht et al.

[11] 3,910,208

[45] Oct. 7, 1975

[54] FLUIDIZED BED FURNACE HAVING COARSE PARTICLE DISCHARGING DEVICE

[75] Inventors: Erhard Albrecht, Essen; Heinz Wilhelm Oepke; Herbert Wulfmeier, both of Mulheim, all of Germany

[73] Assignee: Rheinstahl AG, Germany

[22] Filed: Nov. 8, 1974

[21] Appl. No.: 522,312

[30] Foreign Application Priority Data
Nov. 9, 1973  Germany............................ 2356061

[52] U.S. Cl.................. 110/8 F; 110/165 R; 432/58
[51] Int. Cl.²......................... F23G 7/00; F23J 1/00
[58] Field of Search................ 110/8 F, 28 J, 165 R; 432/58; 122/4 D

[56] References Cited
UNITED STATES PATENTS

| | | | |
|---|---|---|---|
| 3,397,657 | 8/1968 | Tada.................. | 110/28 X |
| 3,578,296 | 5/1971 | Boucraut et al...................... | 432/58 |
| 3,776,150 | 12/1973 | Evans et al........................ | 110/28 X |
| 3,863,577 | 2/1975 | Steever et al......................... | 432/58 |

Primary Examiner—Kenneth W. Sprague
Attorney, Agent, or Firm—McGlew and Tuttle

[57] ABSTRACT

A fluidized bed furnace for burning dehydrated sludge, comprises a furnace housing having a bottom on which the fluidized bed is supported. Means are provided for directing gases, including combustion air, upwardly through the fluidized bed in order to reduce the sludge to fine ash dust which is carried off with a portion of the gases and also to coarse particles which are removed from the furnace bottom. For this purpose, the combustion chamber is provided with a discharge opening directly adjacent the bottom, and preferably with a bottom which is aligned with the surface of the furnace bottom. The diameter of the discharge opening is such that it will allow very large size coarse particles to pass therethrough. A rotary drum is mounted so that its one end connects to the discharge opening, and it is provided with a screw having a pitch of a size to permit coarse particles to move between blade elements and to move them out of the discharge opening into a collecting shaft where the coarse particles are dropped into a receiving device.

10 Claims, 1 Drawing Figure

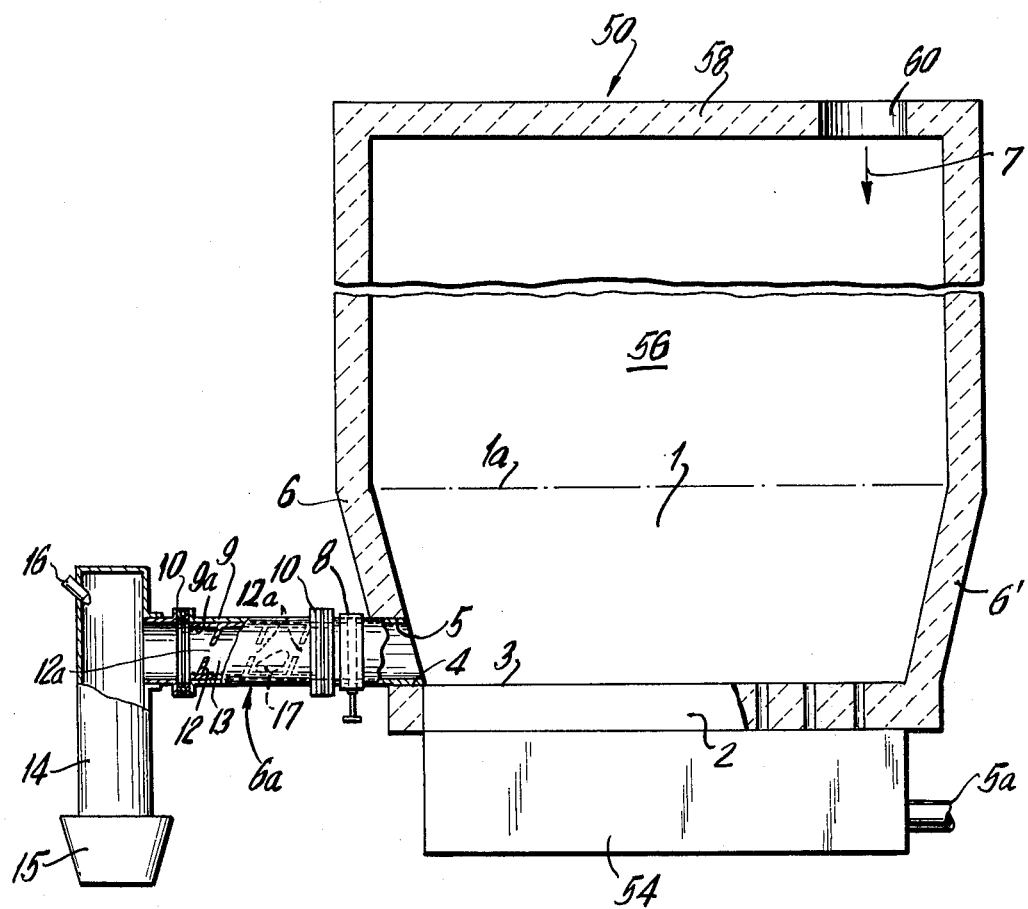

FLUIDIZED BED FURNACE HAVING COARSE PARTICLE DISCHARGING DEVICE

FIELD AND BACKGROUND OF THE INVENTION

This invention relates in general to the construction of a furnace and, in particular, to a new and useful fluidized bed furnace for burning dehydrated sludge and which includes a discharge opening in the furnace directly adjacent the furnace bottom which supports the fluidized bed on the wall opposite to the inlet for the sludge and which has a rotatable screw conveyor connected to the opening for removing relatively large size coarse particles.

DESCRIPTION OF THE PRIOR ART

In the combustion of municipal or industrial sludges in fluidized beds, it is known to provide a lateral opening in the furnace for discharging bed material which is enriched with ashes from the fluidized bed during the burning operation. Very coarse particles, however, cannot be discharged in this manner, so that such particles will remain in the bed unless they are separated in an extensive pretreatment of the sludge and disposed of in another treatment. In such cases, considerable additional expenditure must be taken into consideration.

SUMMARY OF THE INVENTION

The present invention provides a fluidized bed furnace having a discharge device designed so that coarse particles can be removed from the fluidized bed which would be too large and hard for treatment by pulverization in the bed into flue dust and which would be such that they disturb the operation when they are left in the material of the fluidized bed. The invention makes it possible to burn sludges in a fluidized bed which normally would be unsuitable for such treatment.

In accordance with the invention, the discharge opening from the furnace is located directly adjacent the bottom which supports the fluidized bed, and it is connected to a rotary drum having a diameter comparable to the discharge opening diameter, and which is large enough to permit the passage of the coarsest particles which are expected. The inside of the drum wall is designed as a screw having a pitch which is provided with blade elements which are spaced apart sufficiently to accommodate the size of the coarsest occuring particles.

In contrast to the known discharge openings and constructions of fluidized bed furnaces, the invention provides a very large discharge opening in the wall of the fluidized bed furnace and the diameter, for example, is approximately 400 mm. Through such an opening, even the coarsest residues occuring during treatment in the fluidized bed could be removed. With an opening of such dimension, however, the still usable bed material would also be discharged in an extensive amount so that, in practice, at any discharge of the coarser materials, new sand or similar materials had to be refilled as bed material. It would certainly be possible to remove a part of the bed material from the furnace and to separate the coarse residues of the sludge and to recirculate the bed material. However, its heat would be lost and the heat balance of the operation would be disturbed. With the inventive arrangement, in order to retain the bed material to the necessary extent, a rotary drum is provided which turns at a very low speed. The threads or blades of the screw part of the drum prevent the bed material from flowing out, but they permit the secure pickup of the coarse particles which are collected at the free end of the screw, for example, in a receiving chamber or shaft. Since the portion of the screw within the blades or the central passage of the screw is substantially smaller than the coarse particles, only a very small amount of the bed material can flow out freely during the operation and the screw threads discharge only a quantity of bed material corresponding to the rotational speed of the screw. Thus, in this novel discharge device, the drive of the drum is advantageously started only after a large amount of coarse particles has accumulated at the inside of the furnace. In the remaining time, the outflow of the bed material through the free inner passage of the screw can be prevented by a shut-off gate provided between the discharge opening and the drum. It is even possible for example to stop the drum as soon as the last of a sequence of coarse particles has left the free discharge end and to reverse the drive of the drum so that the bed material which has unintentionally passed between the screw threads is returned into the furnace. Because of this construction, the central passage of the drum remains free and a correspondingly higher speed is used for the reverse drive of the drum.

Accordingly, it is an object of the invention to provide a fluidized bed furnace with a discharge adjacent the bottom which supports the fluidized bed on a wall which is opposite to the side at which the sludge is delivered for burning to the furnace and which includes a discharge passage connected thereto having a rotary drum with a screw thread defined along the interior walls leaving a central passage free of relatively small diameter, the drum being rotatable to move the coarse particles out of the fluidized bed and the screw having a pitch such that coarse particles may be fed between blade elements or successive spiral blade screw windings.

A further object of the invention is to provide a device for removal of coarse particles from a fluidized bed furnace which comprises a rotatable drum connected to the discharge of the furnace which has a conveying screw defined on its interior wall which leaves a central passage for smaller size particles and which has a pitch such that the coarse particles may be accommodated between successive coils thereof and which includes a shut-off valve connection for shutting off the end connected to the discharge of the furnace and for opening this end for the removal of the particles.

A further object of the invention is to provide a fluidized bed furnace construction, and a device for removing coarse particles from the fluidized bed which are simple in design, rugged in construction, and economical to manufacture.

For an understanding of the principles of the invention, reference is made to the following description of a typical embodiment thereof as illustrated in the accompanying drawing.

BRIEF DESCRIPTION OF THE DRAWING

The only FIGURE in the case is a schematic transverse sectional view of a fluidized bed furnace constructed in accordance with the invention.

DESCRIPTION OF THE PREFERRED EMBODIMENT

Referring to the drawing in particular, the invention embodied therein, comprises a fluidized bed furnace housing, generally designated 50, which has a fluidized bed 1 maintained therein above a bottom 2. The bed 1 is maintained to a level approximately indicated at 1a and it is maintained in a fluidized condition by circulating heating gases, including combustion air, through a conduit 52 and a wind box 54 upwardly through nozzles in bottom 2 which discharge at the top surface 3 of the bottom. The furnace includes side wall means including a front side wall 6 which is opposite a rear side wall 6' and two other side walls which extend upwardly from the bottom 2 above level 1a of the fluidized bed and define a combustion chamber space 56 below a furnace roof 58. The furnace roof 58 has an opening 60 for the delivery of the sludge into the combustion chamber 56 downwardly in the direction of arrow 7. The opposite wall 6 has a discharge opening 5 which has a bottom surface 4 which is substantially level with the top surface 3 of the bottom 2.

In accordance with the invention, the discharge opening 5 is connected to a discharge conduit, generally designated 62, which contains a gate valve 8 which may be opened and closed. Gate valve 8 is connected by a sealing sleeve connection to a rotary drum 9 which is supported for rotation on rotary ball bearings 10. The drum is provided with an annular gear (not shown) which is driven to rotate the drum during certain operating periods. The opposite end of the drum is long enough to extend into an opening of a receiving shaft 14 for coarse materials, and the coarse materials are dropped into the shaft and collected by a transporting device, such as the device 15.

In accordance with a feature of the inventive construction, the rotary drum 9 has an internal wall 9a which is provided with a spirally extending screw 12 having a pitch such that its threads are spaced apart enough to accommodate relatively large size coarse particles 17. These very coarse particles 17 can be moved between the screw threads, out the discharge opening 5, and through the rotatable drum 9, to the collecting shaft 14, without disturbing the operation of the fluidized bed 1. The interiors of the screw threads 12 are spaced apart so as to leave a small diameter opening 12a therebetween for the central passage of smaller size particles.

The rotatable drum 9 is operated only at certain times, and during such times of operation, the gate is opened to permit withdrawal of the relatively coarse particles which are part of the fluidized bed 1. The fluidized bed 1 also includes other refractory particles which are retained for its operation. During operation of drum 9, only coarse particles 17 may be removed or other particles which are not quite as coarse and there is no disturbance of the fluidized bed 1. In the event that the particles must be returned to the bed for any reason, this drum 9 may be rotated in a reverse direction. The collecting chamber or shaft 14 is advantageously provided with nozzles 16 which are directed toward the discharge end of drum 9 in order to direct a water spray for cooling both the drum 9 and the discharged coarse particles.

While a specific embodiment of the invention has been shown and described in detail to illustrate the application of the principles of the invention, it will be understood that the invention may be embodied otherwise without departing from such principles.

What is claimed is:

1. A fluidized bed furnace for dehydrated sludge, comprising a furnace housing having a bottom on which the fluidized bed is supported, means for directing combustion air upwardly through said bottom for maintaining the fluidized bed and for reducing the sludge to fine ash dust which is directed out of said furnace with a portion of the combustion air and for also generating coarse particles, wall means extending upwardly from, around and over said bottom and defining a fluidized bed chamber portion and a combustion chamber thereabove, means for admitting a sludge material connected into said wall means to said combustion chamber adjacent one side thereof, a discharge opening defined in said wall means adjacent said bottom on the opposite side of said wall means from said admitting means to permit withdrawal of relatively large size coarse particles therethrough, a discharge conduit connected to said discharge opening having a rotatable drum portion with an interior wall having a screw thread therein which when rotated will advance coarse particles out of said discharge conduit from said discharge opening, said threads having a pitch large enough to accommodate the size of a largest occurring particle to be moved therebetween through said discharge.

2. A fluidized bed furnace, according to claim 1, including a shut-off gate in said discharge between said rotary drum and said discharge opening.

3. A fluidized bed furnace, according to claim 1, including a collecting chamber connected to said discharge conduit on the side thereof opposite to the connection to said furnace.

4. A fluidized bed furnace, according to claim 3, including at least one nozzle for directing a cooling water against said drum adjacent said collecting chamber.

5. A fluidized bed furnace, according to claim 1, wherein said drum may be rotated in either direction for the purpose of discharging materials from said furnace or supplying material to said furnace.

6. A fluidized bed furnace, according to claim 1, wherein means for admitting sludge material is provided in the roof of said furnace on the side thereof opposite to said discharge opening.

7. A device for use with a fluidized bed furnace which is connectable to the furnace adjacent the bottom thereof, comprising a discharge passage having a rotatable drum portion with an interior wall having a screw thread extending therealong of a pitch such that the spacing between successive thread windings is large enough to accommodate the largest size particles expected to be formed in the fluidized bed and having a central passage defined between the threads for permitting smaller size particles to pass therethrough.

8. A device for use with a fluidized bed furnace, according to claim 7, including a shut-off gate arranged between said rotatable drum and the end of the discharge passage connected to the furnace.

9. A device for use with a fluidized bed furnace, according to claim 8, including a receiving shaft connected to said discharge conduit at the end thereof opposite to the end connected to the furnace for receiving the particles from the discharge conduit.

10. A device for use with a fluidized bed furnace, according to claim 9, including a spray nozzle carried in said collecting chamber for directing a spray against said drum adjacent the end thereof which discharges into said receiving chamber.

* * * * *